United States Patent
Fodor et al.

(10) Patent No.: US 9,366,760 B2
(45) Date of Patent: Jun. 14, 2016

(54) COVERAGE EXTENSION OF POSITION SERVICES

(75) Inventors: Gabor Fodor, Hässelby (SE); Muhammad Kazmi, Bromma (SE); Iana Siomina, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 769 days.

(21) Appl. No.: 13/640,373

(22) PCT Filed: Apr. 12, 2010

(86) PCT No.: PCT/SE2010/050394
§ 371 (c)(1),
(2), (4) Date: Oct. 10, 2012

(87) PCT Pub. No.: WO2011/129726
PCT Pub. Date: Oct. 20, 2011

(65) Prior Publication Data
US 2013/0027247 A1    Jan. 31, 2013

(51) Int. Cl.
*G01S 19/11* (2010.01)

(52) U.S. Cl.
CPC ........................ *G01S 19/11* (2013.01)

(58) Field of Classification Search
CPC ........................................... G01S 19/11
USPC ........................................ 342/357.48
See application file for complete search history.

(56) References Cited

U.S. PATENT DOCUMENTS

| | | | | |
|---|---|---|---|---|
| 5,043,736 A * | 8/1991 | Darnell | ................ | G01S 5/0027 342/357.46 |
| 5,359,521 A * | 10/1994 | Kyrtsos | ................. | G01S 19/47 340/988 |
| 5,577,025 A * | 11/1996 | Skinner et al. | ................ | 370/209 |
| 5,959,575 A * | 9/1999 | Abbott | .................... | 342/357.31 |
| 6,289,280 B1 * | 9/2001 | Fernandez-Corbaton | | G01S 19/46 340/988 |
| 6,313,787 B1 * | 11/2001 | King et al. | ................ | 342/357.42 |
| 6,473,032 B1 | 10/2002 | Trimble | | |
| 6,825,801 B1 | 11/2004 | Coldiron, Sr. et al. | | |
| 2002/0070891 A1 * | 6/2002 | Huston et al. | ............ | 342/357.09 |
| 2003/0112181 A1 * | 6/2003 | Kalafut et al. | ................ | 342/385 |
| 2008/0299992 A1 | 12/2008 | Eitan et al. | | |
| 2008/0318596 A1 * | 12/2008 | Tenny | ........................ | 455/456.2 |

FOREIGN PATENT DOCUMENTS

| | | |
|---|---|---|
| GB | 2426399 A | 11/2006 |
| WO | 2007030384 A2 | 3/2007 |

OTHER PUBLICATIONS

Briso et al, "An Automated Emulator of Mobile Satellite Link," 27th European Microwave Conference, Sep. 12, 1997, pp. 279-284.

* cited by examiner

*Primary Examiner* — Frank J McGue
(74) *Attorney, Agent, or Firm* — Murphy, Bilak & Homiller, PLLC

(57) ABSTRACT

The present solution relates to a method in a user equipment (110) for providing navigation signals to a navigator device (104) for use in determining the location of the navigator device. The user equipment (110) selects a plurality of satellites whose signals are to be emulated. After determining the position of the user equipment (110), the user equipment (110) translates the determined position to emulating navigation signals using a parameter derived from each of the respective selected satellites. The user equipment (110) transmits, to the navigator device (104), the emulated navigation signals. The emulated navigation signals enable the navigator device to determine the location of the navigator device (104).

8 Claims, 6 Drawing Sheets

COVERAGE EXTENSION OF POSITION SERVICES

TECHNICAL FIELD

This solution relates generally to a user equipment, a method in the user equipment, a navigator device, and a method in the navigator device. More particularly this solution relates to providing navigation signals to the navigator device for use in determining the location of the navigator device.

BACKGROUND

Coverage issues of satellite based location and positioning services have become extremely popular, largely due to reliability of the Global Navigation Satellite Systems (GNSS) in general and the Global Positioning System (GPS) in particular. Relatively inexpensive but highly accurate GPS receivers and navigation devices have reached a high penetration among car drivers, but GPS based services are very attractive in the public safety and emergency, electrical power distribution, transportation, military and other sectors as well.

Satellite based services often suffer from coverage problems in indoor and closed areas due to the "invisibility" of the satellite signals in such areas. This issue is widely recognized and a number of solution approaches have been proposed and implemented. For instance, GPS repeaters which effectively re-radiate GPS signals in tunnel networks have been reported to extend the coverage area of GPS signals. Unfortunately, the accuracy of positioning services relying on re-radiated GPS signals may become poor due to the nature of how the positioning algorithm works. In simple terms, GPS receivers rely on a generalization of triangulation and the related method of resectioning, in 3 dimensions that are dependent on the time difference of arrivals of GPS signals from different satellite stations.

Global Navigation Satellite System (GNSS) is the standard generic term for satellite navigation systems that enable subscribers to locate their position and acquire other relevant navigational information. The US Global Positioning System (GPS) and the European Galileo positioning system are well known examples of GNSS. GPS is also the only satellite based location method, which is presently operational and is widely adopted for commercial, private and military purposes.

A GPS navigator may either be in the form of a handheld standalone navigator or coupled with a wireless terminal, in a cellular communication system. GPS navigators coupled with user equipments are termed as Assisted GPS (A-GPS), which is tailored to work with a user equipment and thus enables user equipment subscribers to relatively accurately determine their location, time, and even velocity, including direction, in open area environment provided that sufficient number of satellites are visible. By the virtue of assisted GPS, A-GPS enables faster determination of location especially after the cold start. Nonetheless, in both cases the location is determined from the satellite signals.

In a typical cellular system, also referred to as a wireless communications network, the wireless terminals, also known as mobile stations and/or user equipment units (UEs) communicate via a Radio Access Network (RAN) to one or more core networks. The wireless terminals can be mobile stations or user equipments such as mobile telephones also known as "cellular" telephones, and laptops with wireless capability, e.g., mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called NodeB, B node or evolved Node B (eNB) and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipments within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using WCDMA for user equipment units. The Third Generation Partnership Project (3GPP) has undertaken to evolve further the UTRAN and GSM based radio access network technologies. In 3GPP this work regarding the 3GPP Long Term Evolution (LTE) system is ongoing.

GPS based positioning in the 3GPP UTRAN system is already standardized. Similarly, the LTE system provides explicit requirements and support for determining the GPS coordinates of user equipments. User equipments equipped with a GPS navigator and capable of receiving the signals of GPS satellites may determine their own coordinates with a much finer granularity, especially in open areas, than that enabled by path loss, geometry and System Frame Number (SFN) time difference measurements.

Cellular coverage in closed areas, such as city tunnels or underground train tunnels is typically much better than satellite coverage, including GPS coverage. Determining the geographical position using cellular coverage may be based on path loss measurements and reporting that allow the serving base station to calculate the geometry of the served user equipments. Once the geometry is established, base stations may estimate the geographical position by, for instance, using pre-established data bases, obtained during measurement campaigns that associate geometry values with geographical positions, so called spatial coordinates.

A well known specific example is that of the so called location fingerprinting positioning method. It is based on the creation of a radio fingerprint based on path loss or signal strength measurements for each point of a fine coordinate grid that covers the RAN. The fingerprint method may e.g. comprise:

The cell IDs that are detected by the user equipment, in each grid point.
Quantized path loss or signal strength measurements, with regards to multiple radio base stations, performed by the user equipment, in each grid point.

Whenever a position request arrives at the user equipment, a radio fingerprint is first measured, after which the corresponding grid point is looked up and reported. Determining the user equipment position may also be based on measuring the time difference between the SFNs of the serving cell and different neighboring cells, as in WCDMA systems. In such systems, user equipments may track their positions by measuring SFN-SFN time difference type 2. Since the above mentioned methods rely on cellular coverage, they may easily be employed both in indoor and open area environments.

The main problem of employing GPS repeaters is that the positioning and timing accuracy becomes poor as the indoor or closed area increases. For instance, the GPS positioning error becomes large in long tunnels due to the distorted difference of time arrival of the re-radiated signals as compared to the time arrival difference of the original satellite signals. Another source of inaccuracy is the interference of the original and the repeated GPS signals at the edges and openings of the closed area, e.g. tunnel ends or indoor area lying close to an open area. This is because GPS repeaters use the same frequency for repeating the signal as the original frequencies used by the satellite system.

With the current GPS repeaters, the navigator device always gives the position of the outdoor antenna instead of the real position. This fact and also the increased interference with the original signals result in that the current solutions are not well-suited for navigation in medium and large indoor areas, such as e.g. tunnels, or large urban canyons. Extending the coverage of GPS signals into the GPS-problematic areas while addressing the interference issue is of high importance.

Apart from these technical issues, the installation and operation of GPS repeaters that do not provide the required accuracy are costly. This is problematic, since traditional GPS repeaters typically operate in a business model in which it is difficult to finance the GPS repeater infrastructure. This is because there is no "GPS Operator" and "GPS subscription", the US government providing the GPS service to the public free of charge, in the sense that would be similar to a subscription based cellular service provisioning.

The widely used mobile phones, even equipped with a GPS navigator, often cannot fully replace advanced GPS navigators implemented as standalone devices, due to, for example, a smaller screen and worse accuracy.

SUMMARY

The objective problem is therefore to provide a mechanism that improves the coverage of satellite based positioning services.

According to a first aspect of the invention, the objective problem is solved by a method in a user equipment for providing navigation signals to a navigator device for use in determining the location of the navigator device. The user equipment selects a plurality of satellites whose signals are to be emulated. After determining the position of the user equipment, the user equipment translates the determined position to emulating navigation signals using a parameter derived from each of the respective selected satellites. The user equipment transmits, to the navigator device, the emulated navigation signals. The emulated navigation signals enable the navigator device to determine the location of the navigator device.

According to a second aspect of the invention, the objective problem is solved by a method in a navigator device for providing navigation signals to a navigator device for use in determining the location of the navigator device. The navigator device receives navigation signals direct or indirect via a repeater, from at least one satellite over at least one satellite channel. The satellite channel is a communication channel between the satellite and the repeater. The navigator device receives shifted navigation signals from the repeater over at least one channel. The channel is a communication channel between the repeater and the navigator device. After receiving the satellite navigation signals, the navigator device determines if the quality of the navigation signals received from the satellite is below a threshold value. When the navigation signals received from the satellite are below the threshold, the navigator device receives assistance data from a user equipment or a base station. The assistance data comprises information of channels to which the navigational signals from the at least one satellite are shifted by the repeater. The navigator device determines the location of the navigator device by using the received shifted signals.

According to a third aspect of the invention, the objective problem is solved by a user equipment for providing navigation signals to a navigator device for use in determining the location of the navigator device. The user equipment comprises a selecting unit which is configured to select a plurality of satellites whose signals are to be emulated. The user equipment further comprises a determining unit configured to determine the position of the user equipment. The user equipment comprises a translating unit configured to translate the determined position of the user equipment to emulating navigation signals, using a parameter derived from each of the respective emulated satellite signals. Further, the user equipment comprises a transmitter which is configured to transmit the emulated navigation signals to the navigator device for use in determining the location of the navigator device.

According to a fourth aspect of the invention, the objective problem is solved by a navigator device for providing navigation signals to the navigator device for use in determining the location of the navigator device. The navigator device comprises a receiver which is configured to receive navigation signals directly or indirectly via a repeater, from at least one satellite over at least one satellite channel, which satellite channel is a communication channel between the satellite and the repeater. The receiver is further configured to receive shifted navigation signals from the repeater over at least one channel. The channel is a communication channel between the repeater and the navigator device. The receiver is even further configured to receive assistance data from the user equipment or the base station if the navigation signals received from the satellite are below a threshold. The assistance data comprises information of channels over which the navigational signals from the at least one satellite are shifted by the repeater. The navigator device also comprises a determining unit which is configured to determine if the quality of the navigation signals received from the satellite is below the threshold value, and to determine the location of the navigator device by using the received shifted signals.

Thanks to that the user equipment selects a plurality of satellites whose signals are to be emulated, determining the position of the user equipment, translating the determined position of the user equipment to emulating navigation signals using a parameter derived from each of the respective selected satellites, and transmits to the navigator device, the emulated navigation signals, which emulated navigation signals enables the navigator device to determine the location of the navigator device, a mechanism that improves the coverage of satellite based positioning services is provided.

The present technology affords many advantages, for which a non-exhaustive list of examples follows:

The navigation accuracy is at least as good accuracy as prior art solutions, provided that the user equipment is co-located with the navigator device. Co-located implies that the navigator device 104 and user equipment 110 are located in close proximity of each other or that the navigator device 104 is built into the user equipment 110 etc.

Another advantage is that the present solution provides similar coverage for GNSS services as for cellular services.

The present solution enables standalone GPS navigators of the state of the art to benefit from the ubiquity of the cellular coverage.

The implementation of the present solution may in some embodiments be transparent to a navigator device, which means that all existing navigator devices are compatible with the present solution.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the solution and in which.

The drawings are not necessarily to scale, emphasize is instead being placed upon illustrating the principle of the solution.

DETAILED DESCRIPTION

The basic idea of the present solution is to extend the GPS coverage, i.e. to emulate the GPS signals from a user equipment that is in the proximity of a GPS navigator, and to use assistance data. This solution addresses the problems of existing positioning coverage problems.

Figure 1:
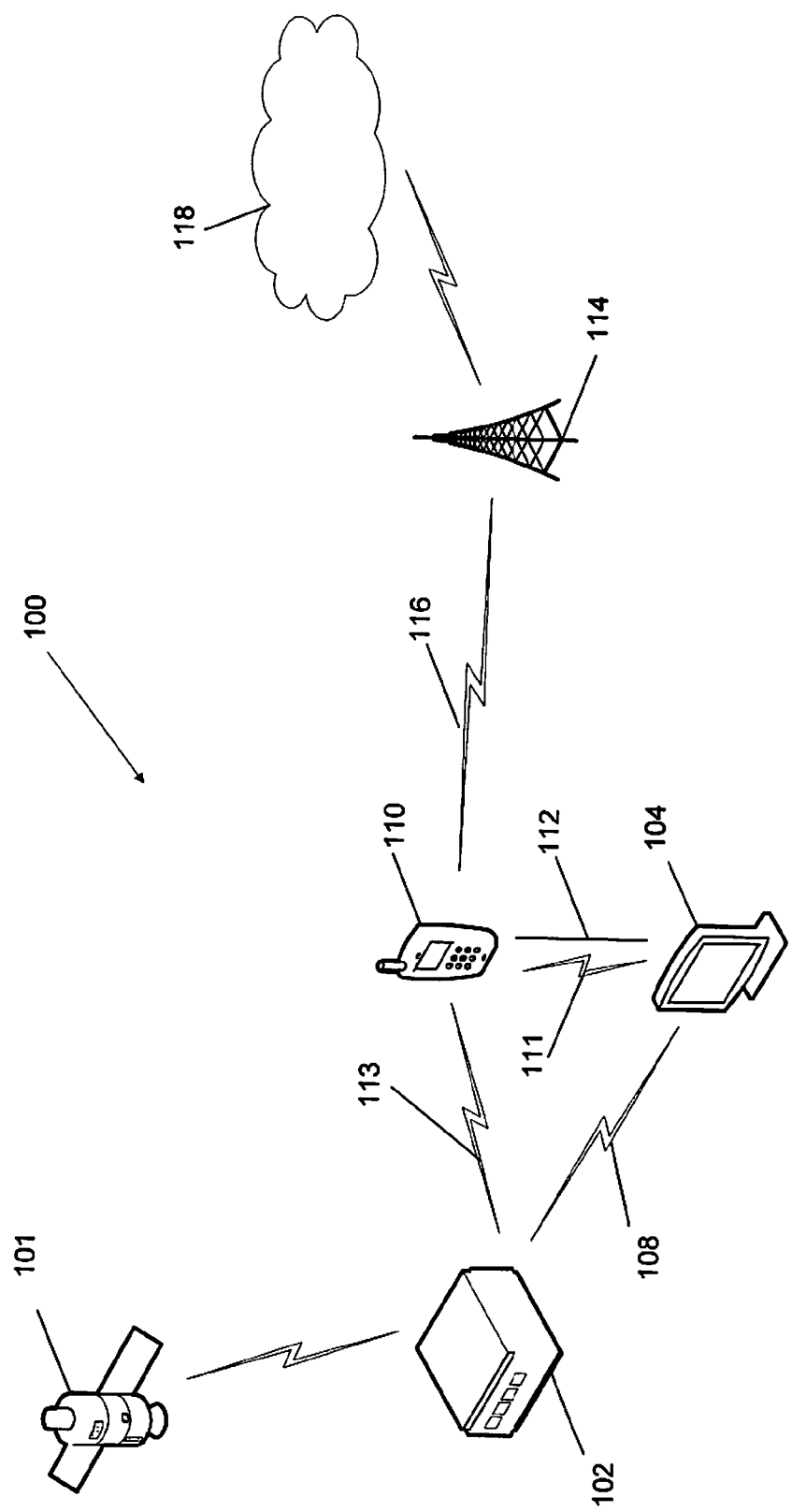
FIG. 1 is a schematic block diagram illustrating embodiments of a system.

FIG. 1 depicts a system 100 comprising a satellite 101. The satellite 101 may be a dedicated navigation satellite or another type of satellite configured to provide navigation signals. The satellite 101 may be for example a GPS satellite, a Glonass satellite or a Galileo satellite. Although the present solution is described with particular focus on the GPS, the solution is equally applicable to any GNSS technology. Even though FIG. 1 only shows one satellite 101, it is obvious for a person skilled in the art that at least three satellites 101 are necessary to execute triangulation and thereby to provide navigation position. The satellite 101 transmits signals to a repeater 102. The repeater 102 receives the satellite signals and forwards them to a navigator device 104. The repeater 102 may shift the satellite signals to another channel before forwarding them to the navigator device 104, which will be described in more detail below. The channel to which the satellites signals are shifted is a channel different from the channel on which the repeater receives the signal from the satellite 101. The navigator device 104 and the repeater 102 communicate with each other over a wireless channel 108, using the standard satellite, e.g. GPS, wireless channels.

Typically the repeater 102 remains transparent to the navigator device 104, since commercial navigators are not prepared to switch to another frequency channel to receive the repeater signals. Therefore, the wireless link 108 between the repeater 102 and the navigator device 104 is a radio link operating in the same frequency band and using the same modulation and coding as the satellites 101 use to send signals to the navigator device 104. The navigator device 104 is a device that receives processed navigation signals from the repeater 102 for the purpose of determining the present location of the navigator device 104. The navigator device 104 may comprise a variety of e.g. user interfaces including maps, guidance and voice instructions.

The system 100 further comprises a user equipment 110. The user equipment 110 may be any suitable communication device or computational device with communication capabilities, for instance but not limited to mobile phone, smart phone, personal digital assistant (PDA), laptop, MP3 player or portable DVD player, or similar media content devices, digital camera, or even stationary devices such as a Personal Computer (PC). A PC may also be connected via the user equipment 110 as an end station of the broadcasted or multicasted media.

In a navigation situation, the navigator device 104 is typically located in a car, and the user equipment 110 is typically also located in the car. I.e. the navigator device 104 and the user equipment 110 are co-located. Co-located implies that the navigator device 104 and user equipment 110 are located in close proximity of each other or that the navigator device 104 is built into the user equipment 110 etc. The user equipment 110 and the navigator device 104 may communicate with each other using a wireless 111 or wired 112 link.

The repeater 102 and the user equipment 110 communicate wirelessly with each other using any suitable protocol and radio link 113. The user equipment 110 communicates wirelessly with a base station 114 using any suitable protocol and radio link 116. The link may use any suitable protocol depending on type and level of layer, e.g. as indicated by the Open System Interconnection (OSI) model, as understood by the person skilled in the art. The base station 114 may be a radio base station (RBS) of the Global System for Mobile communications (GSM) or cdma2000 or third and fourth generation base stations, such as a NodeB, evolved NodeB (eNodeB), or any other network unit capable to communicate over a radio carrier 116 with a user equipment 110. The base station 114 is connected to a core network 118 providing e.g. internet services to the user equipment 110.

It should be appreciated that the system 100 is configured with cabling, routers, switches, and other network building elements (not shown) as understood by the skilled person, for instance as used for building an Ethernet or WAN network.

Figure 2:
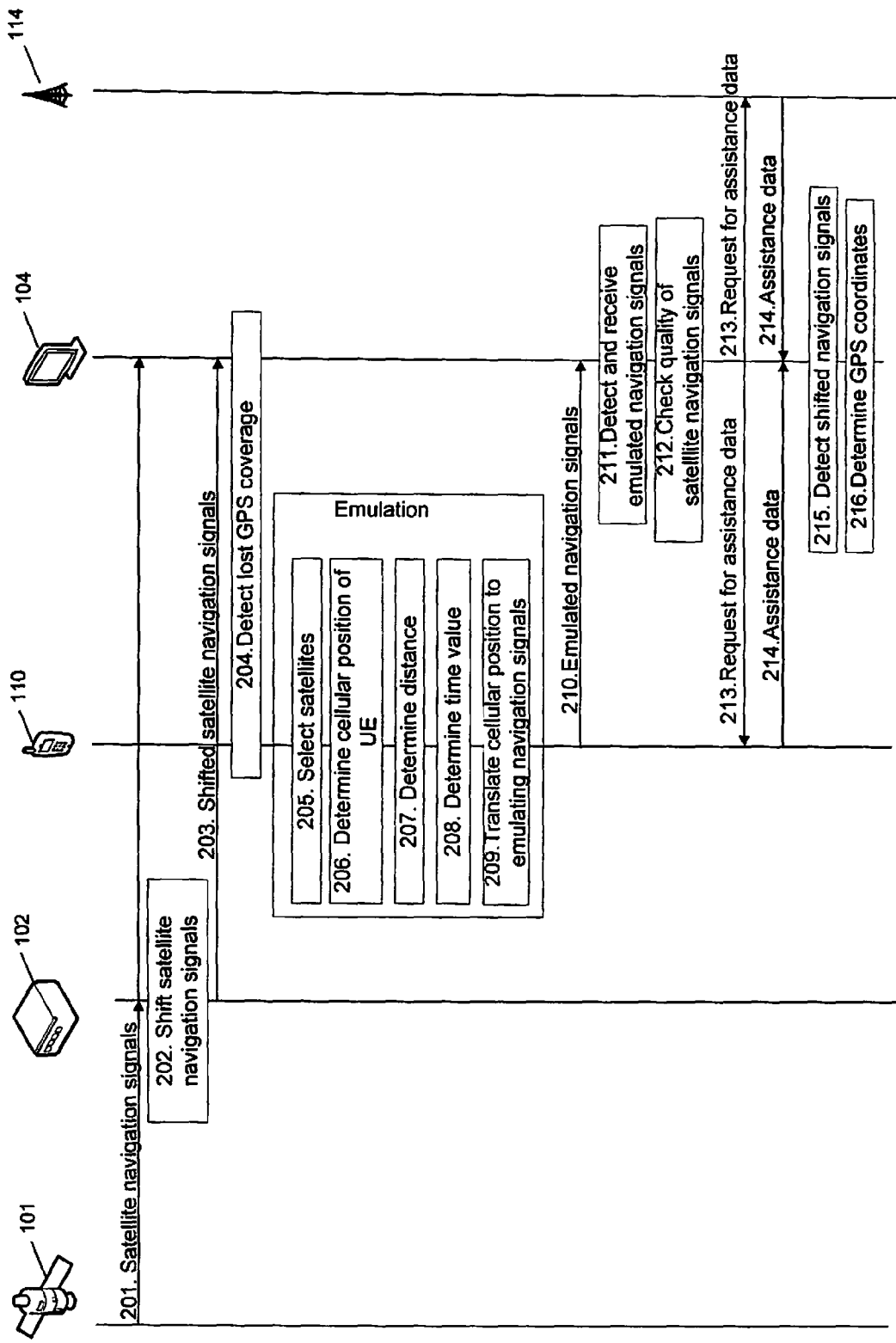
FIG. 2 is a combined schematic block diagram and flowchart depicting embodiments of a method.

The present solution method for providing navigation signals to a navigator device 104 for use in determining the location of the navigator device 104, according to some embodiments will now be described with reference to the combined signaling diagram and flowchart depicted in FIG. 2. The method comprises the following steps, which steps may as well be carried out in another suitable order than described below, as understood by a person skilled in the art.

Transmitted satellite signals are typically of very low power, but the use of spread spectrum technology makes it possible to recover the signals on or near the Earth's surface even from below the noise floor. However, the satellite signals are clearly vulnerable to any type of random, unintentional interference. When repeaters, such as the repeater 102, are employed to re-radiate e.g. GPS signals in e.g. tunnel networks, the caused interference may be so severe that makes it impossible to recover either the original or the re-radiated signal at areas close to the edges of the coverage area. In open areas, typical location accuracy based on GPS signals is within 50 m. Therefore even in a middle of a long tunnel e.g. 200 m or longer, the current repeaters may induce positioning error much larger than in a normal outdoor environment.

Step 201

At least one satellite 101 transmits satellite navigation signals to the navigator device 104, directly or indirectly via the repeater 102. The satellite navigation signals are transmitted on a satellite channel. The GPS code sequences are different for each satellite 101, selected from a limited set of non-interfering codes called Gold Codes. Since all GPS satellites transmit at the same frequencies, the system uses Code Division Multiple Access (CDMA) to distinguish individual satellites 101 by their unique code sequences.

Step 202

The repeater 102 shifts the received navigation signals to a channel different from the channel on which the satellite navigation signals are received.

It is assumed that there are typically more than one outdoor repeater 102 installed around the closed area, e.g. a tunnel. Each outdoor installed repeater 102 receives the signals from a set of satellites 101. When the repeater 102 detects the signal, it shifts the signal to a different channel, which is orthogonal to the received signal channel. In fact the received signal channel and all shifted channels are orthogonal to each other. More specifically the shifted channel may be a code sequence, different frequency or the combination of these which is orthogonal to the received sequence. These orthogonal channels may be preconfigured in each outdoor repeater 102, or it may generate such an orthogonal channel upon reception of the signal from a predefined set of channels.

Step 203

The repeater 102 transmits the shifted satellite navigation signals to the navigator device 104 using the shifted channel.

Step 204

The user equipment 110 and/or the navigator device 114 detects that they have entered an area with limited or no GPS coverage. An area with limited GPS coverage, e.g. GPS outage area, is out of sight from the satellite 101 and may be an indoor or closed area, such as a tunnel.

The detection of lost GPS coverage is triggered by a trigger, which is represented by a request and a response related to satellite signal emulation from a network node 114, or an indicator related to satellite signal emulation received from a network node 114.

The user equipment 110 may be equipped with an emulator device or transmitter, either built-in or externally attached to the user equipment 110, which transmits low power GPS signals on the GPS predefined frequencies, e.g. 1575.42 and 1227.69 MHz and 1176.45 MHz. The GPS emulation has the purpose of emitting GPS signals and generating GPS navigation messages such that the navigator device 104 observes the signals as if they were transmitted from different satellites 101. Specifically, the purpose is to emit these signals in such a way that the navigator device 104 executing the classical triangulation and resection algorithms determines the same position as that of the emulating user equipment 110.

The trigger is related to a criterion for the user equipment 110 to find out when to start and stop signal generation. In one embodiment, the user equipment 110 receives 'keep emulating' signals or indicators from an external device, equipped at the entrance/exit and interior of tunnels, indoor areas, etc. This "keep emulating" signal may be generated by the base stations 114 or wireless access points installed inside the closed area or tunnel. This signal may be part of the broadcasted system information, or the user equipment 110 may receive it from its serving base station 114 on a dedicated channel.

In the absence of the "keep emulating" signal or message, the user equipment 110 stops emulation. For instance an external base station 114 located in an open area does not send this message "keep emulating". Hence the user equipment 110 stops emulation when it is served by this external base station 114.

The user equipment 110 may send a request "emulate, yes or no" to a base station 114, and receive in return a response from the base station 114 saying "yes" or "no".

In some scenarios the user equipment 110 may be connected to more than one base station 114 such as when in soft handover, e.g. in CDMA systems, or when using Coordinated Multiple Point transmission and reception (COMP). In such scenarios it may also be possible that an indoor user equipment 110 may also be connected to one or several of the base stations 114, which are located in open area. Nonetheless, one of the base stations 114 may act as the serving or primary base station. Hence one possibility may be that the user equipment 110 checks only the serving base station for the presence of "keep emulating" message.

Thus, if the serving base station sends "keep emulating" message, the user equipment 110 performs emulation. Another possibility is that the user equipment 110 emulates provided majority of the connected base stations 114 send the "keep emulating" message.

Yet another possibility is that emulation is done provided all the base stations 114 send the message.

Yet another possibility is that the user equipment 114 performs emulation provided at least one base station 114 sends the message.

Another alternative is that the user equipment 110 may decide by itself to start/stop emulating upon entering some geographical area, given the user equipment 110 knows, e.g. the user equipment 110 is preprogrammed, that the area is a special area with limited GPS coverage.

Another alternative is that if the user equipment 110 having a built-in GPS receiver, and when the GPS receiver itself detects loss of coverage.

After receiving such a "keep emulating" signal, the user equipment 110 keeps generating the GPS signals for the duration of x seconds, where x is a user configurable value. The user configurable value may typically range from 5-100, but configurable to "until explicit user generated stop". Alternatively, the user of the user equipment 110 may explicitly trigger and stop the generation of the GPS emulation signals through the standard graphical user interface of the user equipment 110.

Returning to FIG. 2.

Step 205

The user equipment 110, e.g. the emulator device, selects N satellites 101 from a preprogrammed list, whose signals are to be emulated towards the navigator device 104. Where N>3. The specific value of N may depend on the particular navigation system, e.g. GPS or Galileo. In the GPS system, GPS navigators are requested to detect, at least, four satellite signals for sufficient accuracy of the triangulation algorithm. Theoretically, at least three satellites are sufficient to provide the position of the navigator, however four satellites provides an improved accuracy of the position.

The N satellites 101 may be preprogrammed and pre-selected in the emulator device in such a fashion that it would be feasible for the navigator device 104 to actually see these N satellites 101. The preprogrammed subset of N satellites, i.e. the satellites that are to be emulated, should be such that they could be together visible at some point on the Earth surface at some time. Thus, basically any N satellites can be chosen for a fixed subset for the emulation. It may be so that there might be a subset of satellites that are "never" visible together from any point on the Earth, and in that case such a subset should not be selected for emulation. Apart from this basic criterion, any N satellites 101 may be preprogrammed in the emulation device. In the case that the N satellites 101 are preprogrammed and pre-selected in the emulator device, the step may not necessary be carried out in the described order.

Step 206

The user equipment 110 determines its own position. It is assumed that within the closed area, e.g. GPS outage area, there is cellular coverage. It is also assume that a user equipment 110 that is capable of determining its own position within the coordinate system by using state of the art methods associated with the cellular network are co-located with the navigator device 104. Co-located implies that the navigator device 104 and user equipment 110 are located in close proximity of each other or that the navigator device 104 is built into the user equipment 110 etc.

The user equipment 110 determines its own, cellular, position using state of the art methods, e.g. based on fingerprinting or Observed Time Difference of Arrival (OTDOA), and translates the cellular position into GPS coordinates. Such a translation between the coordinates within a terrestrial cellular network and the universally valid and unique satellite coordinates is possible using state of the art methods used, for instance in Assisted-GPS (A-GPS) for narrowband CDMA systems.

Step 207

The user equipment 110 determines the N distances that it will simulate towards the navigator device 104. The N distances correspond to the distances between the N emulated satellites and the navigator device 104 in such a fashion, that if these N distances are put into the resection and triangulation algorithms of the navigator device 104, then its output is the GPS coordinates of the user equipment 110 since the GPS coordinates of the navigator device 104 is unknown. These N distance values may be called the virtual distances.

Step 208

The user equipment 110 calculates the N time stamp values corresponding to the N virtual distances in such a fashion that if these N time stamps values together with the N satellite identities, i.e. corresponding to specific orbital positions, are placed into the GPS navigation message, then the calculated distances, based on the distance between navigator device 104 and the N satellites 101, are exactly the N virtual distance values calculated in the previous step.

Step 209

The user equipment 110 translates the determined position of the user equipment 110 to emulating navigation signals using the determined distances and time stamp values. At this point, the user equipment 110 has the necessary information to compile N virtual or emulated satellite navigation messages, each containing the following pieces of information:

Satellite ID and exact position.
Time stamp containing the exact time of transmission.

Step 210

The user equipment 110 transmits, to the navigator device 104, the N emulated navigation signals/messages. The emulated navigation signals enable the navigator device 104 to determine the location of the navigator device 104.

Step 211

The navigator device 104 detects and receives the N transmitted signals from the emulator device/user equipment 110. Each signal is generated at least at one of the standard carriers, e.g. L1 (1.58 GHz), L2 (1.23 GHz) or L3 carrier, using the standard GPS spread spectrum technique with N different Gold codes and utilizing sub frames 1-3 of the GPS frame.

The navigator device 104 searches at the default, pre-defined, GPS channels, code sequences and/or frequencies, i.e. the codes currently used in the current GPS system for navigation signals/messages used by the repeater 102.

Step 212

The navigator device 104 determines if the quality of the satellite navigation signals/messages received directly or indirectly via the repeater 102 is below a threshold value. This indicates to the navigator device 104 that it must start searching for other channels.

In case the received signal is below a threshold or is not detectable the navigator device 104 searches the signal at all possible unused codes and/or frequencies. Eventually it locks to the code sequence and/or frequency, which lead to the strongest signal or to those, which ensure that the GPS signal is above threshold. In this embodiment there is no specific signaling between the navigator device 104 and the outdoor repeater 102 or the network node 114. However in order to ensure consistent behavior of different navigator devices 104, rules may be pre-defined.

The navigator device 104 may fetch the used codes and frequencies in a certain area upon entering such a closed area. The codes and frequencies are then fetched from the repeater 102 installed around the closed area.

Step 213

When the received satellite navigation signal is below threshold, the navigator device 104 requests the network, e.g. positioning sever, a network node such as base station 114 or the user equipment 110, to signal assistance data, which comprises codes and/or frequencies used at that location by the outdoor repeater 102.

Step 214

The network node 105 or the user equipment 110 in turn signals the necessary assistance data to the navigator device 104, which comprises one or more set of codes and/or frequencies.

Step 215

The navigator device 104 attempts to detect the transmitted shifted navigation signals only at the signal codes and/or frequencies comprised in the assistance data. This step may apply to A-GPS/A-GNSS case, where the navigator device 104 may acquire assistance data upon request.

The CDMA codes and carrier frequencies may be comprised in the assistance data transmitted by outdoor repeaters 102, i.e. GPS translators, or some other network node, such as a positioning server or radio network controller or a base station, to the navigator device 104 periodically or triggered by an event. In case of A-GPS/A-GNSS such assistance data may be transmitted by the network node 114. Otherwise it may be sent by the outdoor repeater 102, which sends the shifted GPS signal. The assistance data may be transmitted by the outdoor repeater 102 over a separate channel or broadcasted, e.g. being comprised into the system information. In either case, the updated assistance data could be transmitted to the user equipment 110 when entering in a closed area such as in a tunnel or when served by an indoor base station. The assistance data comprises the codes and frequencies used for translating the GPS signals in a tunnel, whilst the original assistance data are then restored upon leaving the tunnel. It is to be noted that the modified navigator devices 104 still remain backward compatible with the legacy systems.

Step 216

The navigator device 104 determines its GPS coordinates. To determine the coordinates, the navigator device 104 records the position and the signal arrival time of each perceived/emulated satellite. It first determines the N distances from the N perceived satellites, based on the received satellite coordinates and time stamps, and executes the state of the art resection and triangulation algorithms to determine its location, e.g. its GPS coordinates.

If, the navigation signals received directly or indirectly from the satellite 101 are below the threshold, the location of the navigator device 104, e.g. its GPS coordinates, is determined by using the received shifted signals.

In summary, the navigator device 104 detects signals on the predefined frequencies and CDMA codes, exactly as it could see the N GPS satellites 101. The responsibility of proper signal generation lies with the transmitter device attached to the cellular user equipment 110.

In another embodiment, which is not transparent to the navigator device 104, it is the navigator device 104 that detects that it has lost GPS coverage. The navigator device 104 is equipped with a short range wireless 111 or a wired 112 interface, by means of which it can communicate with the user equipment 110. The user equipment 110 may send its cellular coordinates to the navigator device 104, or the user equipment 110 may send the translated GPS coordinates to the navigator device 104.

This embodiment consists of the following steps:
The navigator device 104 detects that it has lost GPS coverage. It starts listening to its alternative short range (e.g. Bluetooth) interface.
If the information received through the Bluetooth interface includes valid GPS coordinates, the navigator device 104 uses these coordinates to determine its current position. That is it simply displays the coordinates on its map. It continues to periodically search for GPS signals according to state of the art techniques.
As soon as GPS signals are detected, the navigator device 104 stops listening to the short range interface.

The navigator device 104 may estimate the distance to the user equipment 110, e.g. based on path loss and assuming free space propagation, and applies a "trust location info" certificate to estimate the induced location error and accept/not accept the information from the user equipment 110 and/or inform the user about the error.

Figure 3:
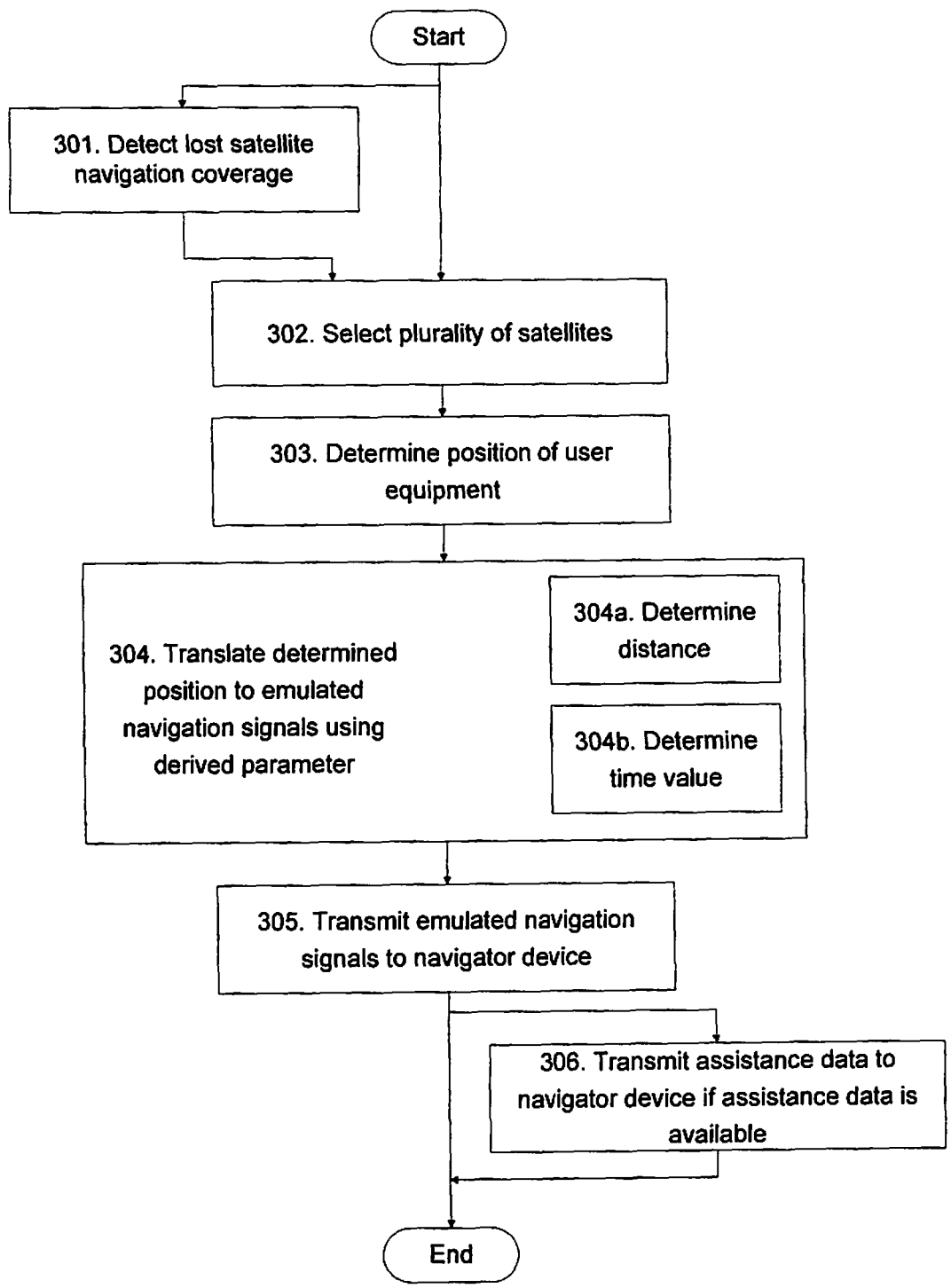
FIG. 3 is a flowchart depicting embodiments of a method in a user equipment.

The method described above will now be described seen from the perspective of the user equipment 110. FIG. 3 is a flowchart describing the present method in the user equipment 110, for providing navigation signals to the navigator device 104 for use in determining the location of the navigator device 104. The method comprises the steps to be performed by the user equipment 110

Step 301
This is an optional step. The user equipment 110 may detect that the navigator device 104 has lost satellite navigation coverage. This step is optional, because in some scenarios the reasons for running the method in the user equipment 110 may be others. Another reason for running the method may be for instance detection of low quality of satellite navigation signals received from the satellites 101.

This step of detecting that the navigator device 104 has lost satellite navigation coverage may be triggered by a trigger. The trigger may be represented by a request and a response related to satellite signal emulation from a network node 114, or an indicator related to satellite signal emulation received from a network node 114.

Step 302
The user equipment 110 selects a plurality of satellites whose signals are to be emulated.

The plurality of satellites may be selected from a predefined list.

Step 303
The user equipment 110 determines the position of the user equipment 110, i.e. it determines its own position.

The user equipment 110 may determine its own, cellular, position using state of the art methods, e.g. based on fingerprinting or Observed Time Difference of Arrival (OTDOA), and translates the cellular position into GPS coordinates. Such a translation between the coordinates within a terrestrial cellular network and the universally valid and unique satellite coordinates is possible using state of the art methods used, for instance in Assisted-GPS (A-GPS) for narrowband CDMA systems.

Step 304
The user equipment 110 translates the determined position of the user equipment 110 to emulating navigation signals using a parameter derived from each of the respective selected satellites 101. A parameter may comprise a plurality of parameters, such as distances corresponding to the distances between each of the respective selected satellites and the navigator device 104 or the user equipment 110 and a time value based on the determined distance.

Step 304a
This is an optional step to be performed under step 304. The user equipment 110 may determine distances corresponding to the distances between the selected satellites and the navigator device 104 or user equipment 110

Step 304b
This is an optional step to be performed under step 304. The user equipment 110 may determine a time value corresponding to the determined distance.

The derived parameter used in the step 304 of translating the determined position to emulating navigation signals may be represented by the determined distances and time value.

Step 305
The user equipment 110 transmits, to the navigator device 104, the emulated navigation signals to enable the navigator device 104 to determine the location of the navigator device 104.

Step 306
This is an optional step. The user equipment 110 may transmit assistance data to the navigator device 104 if assistance data is available. The assistance data may comprise information of at least one channel over which navigation signals from at least one satellite 101 are translated and transmitted by a repeater 102 to a navigator device 104.

The information of at least one channel may comprise at least one of predefined frequencies and Code Division Multiple Access, referred to as CDMA, codes.

The at least one channel may be orthogonal to at least one satellite channel over which navigation satellite signals are transmitted. The satellite channel is a communication channel between the satellite 101 and the repeater 102.

The assistance data may be transmitted periodically, upon request from the navigator device 104 or in response to an event reported by the navigator device 104.

Figure 4:
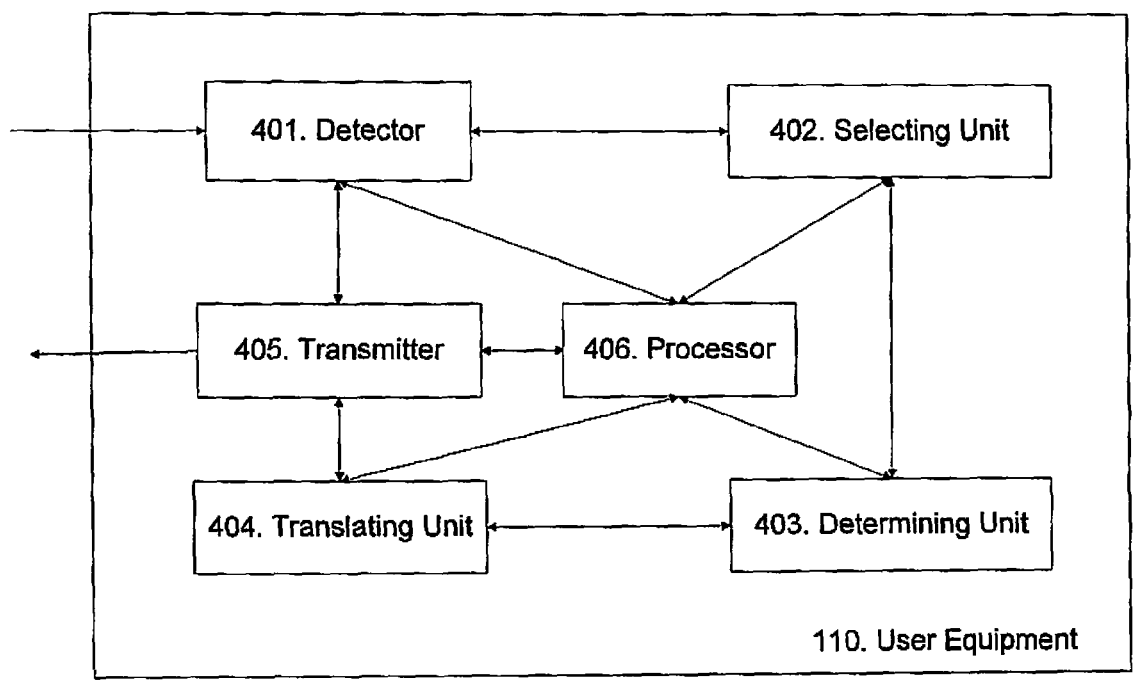
FIG. 4 is a schematic block diagram illustrating embodiments of a user equipment.

To perform the method steps shown in FIG. 3 for providing navigation signals to the navigator device 104 for use in determining the location of the navigator device 104, the user equipment 110 comprises a user equipment arrangement as shown in FIG. 4. The user equipment 110 is configured to provide navigation signals to the navigator device 104 for use in determining the location of the navigator device 104.

The user equipment 110 comprises a selecting unit 402 which is configured to select a plurality of satellites whose signals are to be emulated.

The user equipment 110 further comprises a determining unit 403 configured to determine the position of the user equipment 110.

The user equipment 110 comprises a translating unit 404 configured to translate the determined position of the user equipment 110 to emulating navigation signals, using a parameter derived from each of the respective emulated satellite signals.

The user equipment 110 also comprises a transmitter 405 configured to transmit, to the navigator device 104, the emulated navigation signals, which emulated navigation signals enables the navigator device 104 to determine the location of the navigator device 104.

The user equipment 110 may comprise a detector 401 which is configured to detect that the navigator device 104 has lost satellite navigation coverage. The detector may be triggered by a trigger. The trigger may be represented by a request and a response related to satellite signal emulation from a network node 114, or an indicator related to satellite signal emulation received from a network node 114.

Figure 5:
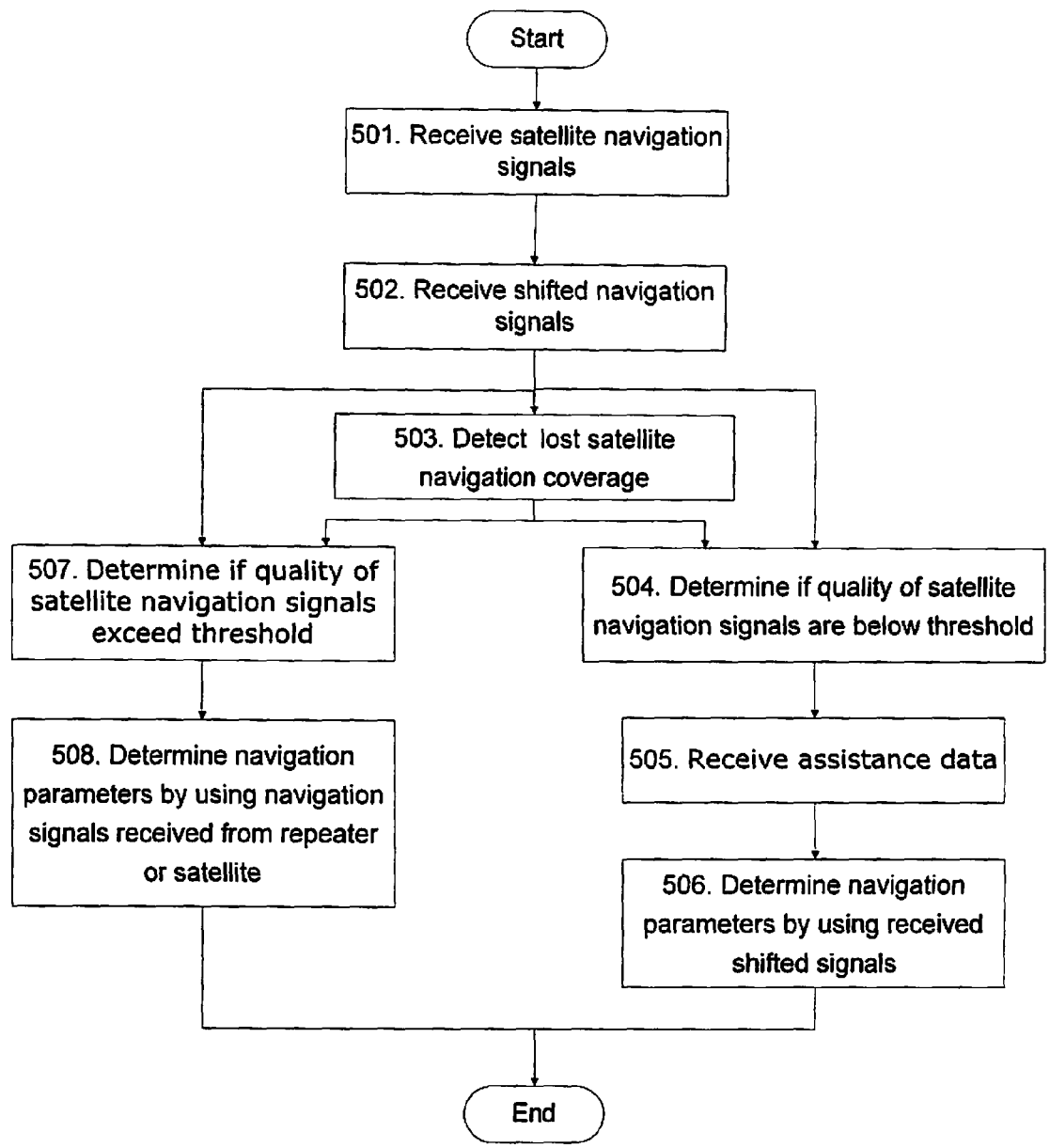
FIG. 5 is a flowchart depicting embodiments of a method in a navigator device.

The method described above will now be described seen from the perspective of the navigator device 104. FIG. 5 is a flowchart describing the present method in the navigator device 104, for providing navigation signals to the navigator device 104 for use in determining the location of the navigator device 104. The method comprises the steps to be performed by the navigator device 104.

Step 501

Receiving navigation signals direct or indirect via a repeater 102, from at least one satellite 101 over at least one satellite channel. The satellite channel is a communication channel between the satellite 101 and the repeater 102.

Step 502

The navigator device 104 receives shifted navigation signals from the repeater 101 over at least one channel. The channel is a communication channel between the repeater 102 and the navigator device 104.

Step 503

This is an optional step. The navigator device 104 may detect that the navigator device 104 has lost satellite navigation coverage 104.

Step 504

The navigator device 104 determines if the quality of the navigation signals received from the satellite 101 are below a threshold value.

The threshold may be at least one pre-defined value or values received from a base station 114 in assistance data or being configured in the navigator device 104.

Step 505

The navigator device 104 receives assistance data from the user equipment 110 or a base station 114 when the satellite navigation signals are below the threshold. The assistance data comprises information of channels over which the navigational signals from the at least one satellite 101 are shifted by the repeater 102.

Step 506

The navigator device 104 determines the location of the navigator device 104 by using the received shifted signals.

Step 507

This is an optional step. The navigator device 104 may determine if the quality of the satellite navigation signals exceed the threshold.

Step 508

This is an optional step. The navigator device 104 may determine the navigation parameters for the navigator device 104 by using the navigation signals received from the repeater 102 or the at least one satellite 101.

Figure 6:
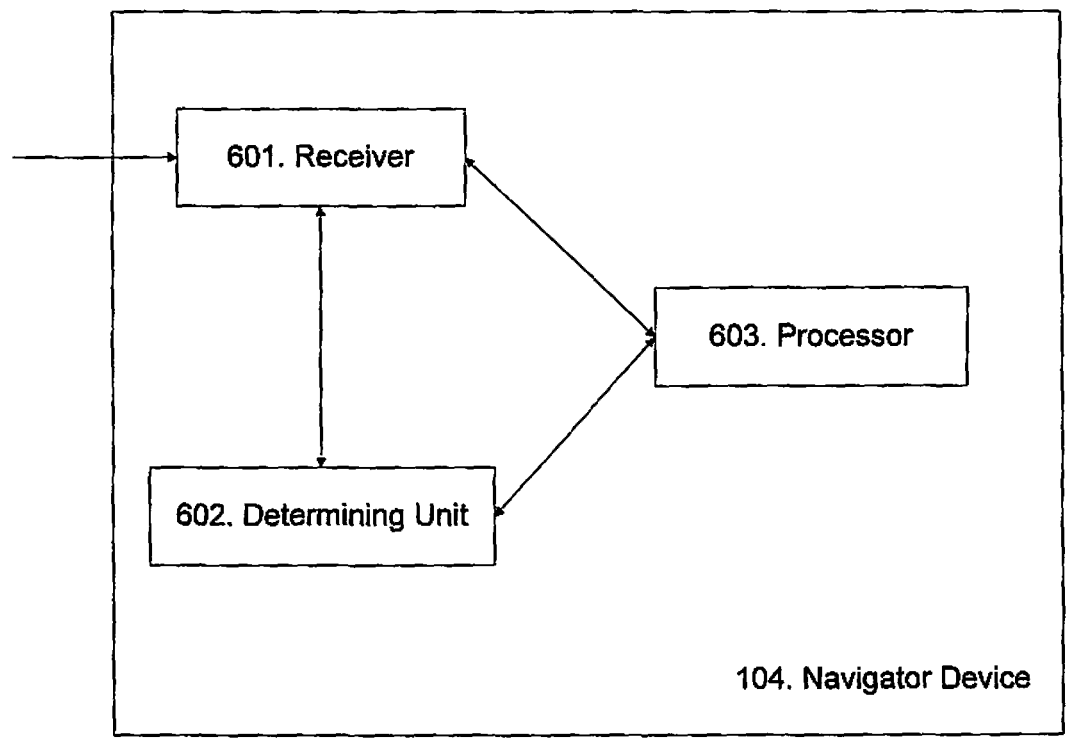
FIG. 6 is a schematic block diagram illustrating embodiments of a navigator device.

To perform the method steps shown in FIG. 5 for providing navigation signals to the navigator device 104 for use in determining the location of the navigator device 104, the navigator device 104 comprises a navigator device arrangement as shown in FIG. 6.

The navigator device 104 is configured to provide navigation signals to the navigator device 104 for use in determining the location of the navigator device 104.

The navigator device 104 comprises a receiver 601 which is configured to receive navigation signals direct or indirect via a repeater 102, from at least one satellite 101 over at least one satellite channel. The satellite channel is a communication channel between the satellite 101 and the repeater 102. The receiver 601 is further configured to receive shifted navigation signals from the repeater 101 over at least one channel. The channel is a communication channel between the repeater 102 and the navigator device 104. The receiver 601 is also configured to receive assistance data from the user equipment 110 or the base station 114 if the navigation signals from the satellite 101 are below a threshold. The assistance data comprises information of channels over which the navigational signals from the at least one satellite 101 are shifted by the repeater 102.

The navigator device 104 comprises a determining unit 602 which is configured to determine if the quality of the navigation signals received from the satellite 101 is below the threshold value, and to determine the location of the navigator device 104 by using the received shifted signals.

The present mechanism for providing navigation signals to the navigator device 104 for use in determining the location of the navigator device 104 may be implemented through one or more processors, such as a processor 406 in the user equipment 110 depicted in FIG. 4 and a processor 603 in the navigator device 104 depicted in FIG. 6, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the user equipment 110 and/or navigator device 104. One such carrier may be in the form of a CD ROM disc. It is however feasible with other data carriers such as a memory stick. The computer program code may furthermore be provided as pure program code on a server and downloaded to the user equipment 110 and/or navigator device 104 remotely.

It should be noted that the word "comprising" does not exclude the presence of other elements or steps than those listed and the words "a" or "an" preceding an element do not exclude the presence of a plurality of such elements. The solution can at least in part be implemented in either software or hardware. It should further be noted that any reference signs do not limit the scope of the claims, and that several "means", "devices", and "units" may be represented by the same item of hardware.

It should also be emphasized that the steps of the methods defined in the appended claims may, without departing from the present solution, be performed in another suitable order than the order in which they appear in the claims. For example, steps 302 and 303 may be performed in another order than described.

The above mentioned and described embodiments are only given as examples and should not be limiting to the present solution. Other solutions, uses, objectives, and functions within the scope of the solution as claimed in the below described patent claims should be apparent for the person skilled in the art.

The invention claimed is:

1. A method in a user equipment configured for operation in a cellular network and for emulating navigation signals for use by a navigator device in determining the location of the navigator device, the method comprising:
    selecting a plurality of satellites whose navigation signals are to be emulated;
    determining a position of the user equipment using cellular positioning and translating the position into corresponding Global Positioning System (GPS) coordinates;
    determining distances to be simulated with respect to the plurality of satellites based on the GPS coordinates of the user equipment;
    generating emulated navigation signals corresponding to identities of the satellites and having time values based on the distances;
    transmitting the emulated navigation signals to the navigator device to thereby enable the navigator device to determine the location of the navigator device as being the GPS coordinates of the user device; and
    transmitting assistance data to the navigator device upon the assistance data becoming available, the assistance data comprising information regarding a communication channel between a repeater and the navigation device and used by the repeater for transmitting shifted navigation signals corresponding to the navigation signals from at least one satellite, wherein the at least one communication channel is orthogonal to at least one satellite channel over which the navigation signals from at least one satellite are transmitted, which at least one satellite channel is between the at least one satellite and the repeater.

2. The method according to claim 1, further comprising detecting that the navigator device has lost satellite navigation coverage, which detecting is triggered by a trigger represented by:
    a request and a response related to satellite signal emulation from a network node; or
    an indicator related to satellite signal emulation received from a network node.

3. The method according to claim 1, wherein the plurality of satellites are selected from a predefined list.

4. The method according to claim 1, wherein the assistance data indicates at least one of predefined frequencies and Code Division Multiple Access (CDMA) codes, used by the repeater for transmitting the shifted navigation signals.

5. The method according to claim 1, wherein the assistance data is transmitted periodically, upon request from the navigator device, or in response to an event reported by the navigator device.

6. A user equipment configured for operation in a cellular network and for providing emulated navigation signals to a navigator device for use in determining the location of the navigator device, the user equipment comprising:
    a selecting unit configured to select a plurality of satellites whose navigation signals are to be emulated;
    a determining unit configured to determine the position of the user equipment using cellular positioning and translate the position into corresponding Global Positioning System (GPS) coordinates;
    a translating unit configured to determine distances to be simulated with respect to the plurality of satellites, based on the GPS coordinates of the user equipment, and to generate emulated navigation signals corresponding to identities of the satellites and having time values based on the distances; and
    a transmitter configured to:
        transmit the emulated navigation signals to the navigator device, thereby enabling the navigator device to determine the location of the navigator device as being the GPS coordinates of the user device; and
        transmit assistance data to the navigator device upon the assistance data becoming available, the assistance data comprising information regarding a communication channel between a repeater and the navigation device and used by the repeater for transmitting shifted navigation signals corresponding to the navigation signals from at least one satellite, wherein the at least one communication channel is orthogonal to at least one satellite channel over which the navigation signals from at least one satellite are transmitted, which at least one satellite channel is between the at least one satellite and the repeater.

7. The user equipment according to claim 6, further wherein the user equipment is configured to generate the emulated navigation signals responsive to detecting that the navigator device has lost satellite navigation coverage.

8. The user equipment according to claim 6, further comprising a detector configured to detect that the navigator device has lost satellite navigation coverage based on detecting: a request and a response related to satellite signal emulation from a network node; or an indicator related to satellite signal emulation received from a network node.

* * * * *